(12) United States Patent
Schmoll et al.

(10) Patent No.: US 10,436,573 B2
(45) Date of Patent: Oct. 8, 2019

(54) BALANCED DETECTION SYSTEMS

(71) Applicants: CARL ZEISS MEDITEC AG, Jena (DE); CARL ZEISS MEDITEC, INC., Dublin, CA (US)

(72) Inventors: Tilman Schmoll, Dublin, CA (US); Matthew J. Everett, Livermore, CA (US); Nathan Shemonski, San Mateo, CA (US)

(73) Assignees: CARL ZEISS MEDITEC, INC., Dublin, CA (US); CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 15/782,018

(22) PCT Filed: Dec. 8, 2016

(86) PCT No.: PCT/EP2016/080224
§ 371 (c)(1),
(2) Date: Jun. 6, 2018

(87) PCT Pub. No.: WO2017/097886
PCT Pub. Date: Jun. 15, 2017

(65) Prior Publication Data
US 2018/0364025 A1 Dec. 20, 2018

Related U.S. Application Data

(60) Provisional application No. 62/265,292, filed on Dec. 9, 2015.

(51) Int. Cl.
*G01B 9/02* (2006.01)
*G02B 27/14* (2006.01)

(52) U.S. Cl.
CPC ..... *G01B 9/02091* (2013.01); *G01B 9/02004* (2013.01); *G01B 9/02041* (2013.01);
(Continued)

(58) Field of Classification Search
CPC ............ G01B 9/02091; G01B 9/02018; G01B 9/02051; G01B 9/02049
See application file for complete search history.

(56) References Cited

U.S. PATENT DOCUMENTS

2006/0087658 A1* 4/2006 Sesko ................ G01B 9/02081
356/493
2007/0182844 A1 8/2007 Allman et al.
(Continued)

FOREIGN PATENT DOCUMENTS

EP 2277028 A1 1/2011
EP 2860488 A1 4/2015
(Continued)

OTHER PUBLICATIONS

Blazkiewicz et al., "Signal-To-Noise Ratio Study of Full-Field Fourier-Domain Optical Coherence Tomography", Applied Optics, vol. 44, No. 36, Dec. 20, 2005, pp. 7722-7729.
(Continued)

*Primary Examiner* — Jonathan M Hansen
(74) *Attorney, Agent, or Firm* — Morrison & Foerster LLP

(57) ABSTRACT

Various balanced detection systems which reduce alignment requirements of free space optics based balanced detection configurations are discussed. One example system includes a light source, a beam divider, sample optics, return optics, and a processor. The light source generates a light beam. The beam divider separates the light beam into reference and sample arms. The sample optics deliver the light beam in the sample arm to a light scattering object to be imaged. The return optics direct light to a balanced detection system, which has a balanced detection beam divider for combining light scattered from the object and light from the reference arm and directing the combined light into two detection channels and two detectors for collecting the combined light
(Continued)

in the two detection channels and generating signals in response thereto. The processor processes the signals and generates image data of the object based on the processed signals.

5 Claims, 4 Drawing Sheets

(52) U.S. Cl.
CPC ..... *G01B 9/02047* (2013.01); *G01B 9/02051* (2013.01); *G01B 9/02018* (2013.01); *G02B 27/144* (2013.01)

(56) References Cited

U.S. PATENT DOCUMENTS

| | | | |
|---|---|---|---|
| 2008/0285043 | A1* | 11/2008 | Fercher ............... A61B 3/102 356/451 |
| 2009/0027688 | A1 | 1/2009 | Pouet |
| 2013/0010302 | A1 | 1/2013 | Sharma et al. |
| 2013/0335706 | A1 | 12/2013 | Schmitt-Manderbach et al. |
| 2014/0028974 | A1 | 1/2014 | Tumlinson |
| 2014/0204388 | A1* | 7/2014 | Osawa ............... G01B 9/02091 356/479 |
| 2015/0092195 | A1 | 4/2015 | Blatter et al. |
| 2015/0233700 | A1 | 8/2015 | Schmoll et al. |
| 2016/0206193 | A1 | 7/2016 | Schmoll et al. |
| 2017/0105618 | A1 | 4/2017 | Schmoll et al. |
| 2017/0224208 | A1 | 8/2017 | Bublitz et al. |

FOREIGN PATENT DOCUMENTS

| | | |
|---|---|---|
| WO | 2015/024663 A1 | 2/2015 |
| WO | 2015/052071 A1 | 4/2015 |
| WO | 2015/189174 A2 | 12/2015 |
| WO | 2016/058910 A1 | 4/2016 |

OTHER PUBLICATIONS

Bonin et al., "In Vivo Fourier-Domain Full-Field OCT of the Human Retina with 1.5 Million A-lines/s", Optics Letters, vol. 35, No. 20, Oct. 15, 2010, pp. 3432-3434.

Choma et al., "Sensitivity Advantage of Swept Source and Fourier Domain Optical Coherence Tomography", Optics Express, vol. 11, No. 18, Sep. 8, 2003, pp. 2183-2189.

Fercher et al., "Eye-Length Measurement by Interferometry with Partially Coherent Light", Optics Letters, vol. 13, No. 3, Mar. 1988, pp. 186-188.

Fercher et al., "Measurement of Intraocular Distances by Backscattering Spectral Interferometry", Optics Communications, vol. 117, May 15, 1995, pp. 43-48.

Grajciar et al., "Parallel Fourier Domain Optical Coherence Tomography for in Vivo Measurement of the Human Eye", Optics Express, vol. 13, No. 4, Feb. 21, 2005, pp. 1131-1137.

Hillmann et al., "Holoscopy-Holographic Optical Coherence Tomography", Optics Letters, vol. 36, No. 13, Jul. 1, 2011, pp. 2390-2392.

Hiratsuka et al., "Simultaneous Measurements of Three-Dimensional Reflectivity Distributions in Scattering Media based on Optical Frequency-Domain Reflectomety", Optics letters, vol. 23, No. 18, Sep. 15, 1998, pp. 1420-1422.

Huang et al., "Optical Coherence Tomography", Science, vol. 254, No. 5035, Nov. 22, 1991, pp. 1178-1181.

International Preliminary Report on Patentability received for PCT Patent Application No. PCT/EP2016/080224, dated Jun. 21, 2018, 13 pages.

International Search Report and Written Opinion received for PCT Patent Application No. PCT/EP2016/080224, dated Apr. 11, 2017, 18 pages.

Kim, M. K., "Tomographic Three-Dimensional Imaging of a Biological Specimen using Wavelength-Scanning Digital Interference Holography", Optics Express, vol. 7, No. 9, Oct. 23, 2000, pp. 305-310.

Kim, M. K., "Wavelength-Scanning Digital Interference Holography for Optical Section Imaging", Optics Letters, vol. 24, No. 23, Dec. 1, 1999, pp. 1693-1695.

Klein et al., "Joint Aperture Detection for Speckle Reduction and Increased Collection Efficiency in Ophthalmic MHz OCT", Biomedical Optics Express, vol. 4, No. 4, 2013, pp. 619-634.

Lee et al., "Line-Field Optical Coherence Tomography using Frequency-Sweeping Source", IEEE Journal of Selected Topics in Quantum Electronics, vol. 14, No. 1, Jan./Feb. 2008, pp. 50-55.

Leitgeb et al., "Performance of Fourier Domain vs. Time Domain Optical Coherence Tomography", Optics Express, vol. 11, No. 8, Apr. 21, 2003, pp. 889-894.

Marks et al., "Inverse Scattering for Frequency-Scanned Full-Field Optical Coherence Tomography", Journal of the Optical Society of America A, vol. 24, No. 4, Apr. 2007, pp. 1034-1041.

Mujat et al., "Swept-Source Parallel OCT", Proc. of SPIE, vol. 7168, 2009, pp. 71681E-1-71681E-8.

Nakamura et al., "High-Speed Three-Dimensional Human Retinal Imaging by Line-Field Spectral Domain Optical Coherence Tomography", Optics Express, vol. 15, No. 12, Jun. 11, 2007, pp. 7103-7116.

Nankivil et al., "Coherence Revival Multiplexed, Buffered Swept Source Optical Coherence Tomography: 400 kHz Imaging with a 100 kHz Source", Optics Letters, vol. 39, No. 13, Jul. 1, 2014, pp. 3740-3743.

Potsaid et al., "Ultrahigh Speed 1050nm Swept Source / Fourier Domain OCT Retinal and Anterior Segment Imaging at 100,000 to 400,000 Axial Scans per Second", Optics Express, vol. 18, No. 19, Sep. 13, 2010, pp. 20029-20048.

Považay et al., "Full-Field Time-Encoded Frequency-Domain Optical Coherence Tomography", Optics Express, vol. 14, No. 17, Aug. 21, 2006, pp. 7661-7669.

Wieser et al., "Multi-Megahertz OCT: High quality 3D imaging at 20 million A-Scans and 4.5 GVoxels per Second", Optics Express, vol. 18, No. 14, Jul. 5, 2010, pp. 14685-14704.

Wolf, Emil, "Three-Dimensional Structure Determination of Semi-Transparent Objects from Holographic Data", Optics Communications, vol. 1, No. 4, Sep./Oct. 1969, pp. 153-156.

Yu et al., "Variable Tomographic Scanning with Wavelength Scanning Digital Interference Holography", Optics Communications, vol. 260, 2006, pp. 462-468.

Zuluaga et al., "Spatially Resolved Spectral Interferometry for Determination of Subsurface Structure", Optics Letters, vol. 24, No. 8, Apr. 15, 1999, pp. 519-521.

\* cited by examiner

BALANCED DETECTION SYSTEMS

PRIORITY

This application is a National Phase application under 35 U.S.C. § 371 of International Application No. PCT/EP2016/080224, filed Dec. 8, 2016, which claims priority to U.S. Provisional Application Ser. No. 62/265,292 filed Dec. 9, 2015, the contents of which are hereby incorporated by reference.

TECHNICAL FIELD

The present application relates to the field of interferometric imaging systems.

BACKGROUND

A wide variety of interferometric based imaging techniques have been developed to provide high resolution structural information of samples in a range of applications. Optical Coherence Tomography (OCT) is an interferometric technique that can provide images of samples including tissue structure on the micron scale in situ and in real time (see for example, Huang, D. et al., Science 254, 1178-81, 1991). OCT is based on the principle of low coherence interferometry (LCI) and determines the scattering profile of a sample along the OCT beam by detecting the interference of light reflected from a sample and a reference beam (see for example, Fercher, A. F. et al., Opt. Lett. 13, 186, 1988). Each scattering profile in the depth direction (z) is reconstructed individually into an axial scan, or A-scan. Cross-sectional images (B-scans), and by extension 3D volumes, are built up from many A-scans, with the OCT beam moved to a set of transverse (x and y) locations on the sample.

Many variants of OCT have been developed where different combinations of light sources, scanning configurations, and detection schemes are employed. In time domain OCT (TD-OCT), the pathlength between light returning from the sample and reference light is translated longitudinally in time to recover the depth information in the sample. In frequency-domain or Fourier-domain OCT (FD-OCT), a method based on diffraction tomography (see for example, Wolf, E., Opt. Commun. 1, 153-156, 1969), the broadband interference between reflected sample light and reference light is acquired in the spectral frequency domain and a Fourier transform is used to recover the depth information (see for example, Fercher, A. F. et al., Opt. Commun. 117, 43-48, 1995). The sensitivity advantage of FD-OCT over TD-OCT is well established (see for example, Leitgeb, R. et al., Opt. Express 11, 889, 2003; Choma, M. et al., Opt. Express 11, 2183-9, 2003).

There are two common approaches to FD-OCT. One is spectral domain OCT (SD-OCT) where the interfering light is spectrally dispersed prior to detection and the full depth information can be recovered from a single exposure. The second is swept-source OCT (SS-OCT) where the source is swept over a range of optical frequencies and detected in time, therefore encoding the spectral information in time. In traditional point scanning or flying spot techniques, a single point of light is scanned across the sample. These techniques have found great use in the field of ophthalmology. However, current point scanning systems for use in ophthalmology illuminate the eye with less than 10% of the maximum total power possible for eye illumination spread over a larger area, detect only about 5% of the light exiting the pupil, and use only about 20% of the eye's numerical aperture (NA). It may not be immediately possible to significantly improve these statistics with the current point-scanning architectures since the systems already operate close to their maximum permissible exposure for a stationary beam, suffer from out of focus signal loss, and do not correct for aberrations. Parallel techniques may be able to overcome these challenges.

In parallel techniques, a series of spots (multi-beam), a line of light (line-field), or a two-dimensional field of light (partial-field and full-field) is directed to the sample. The resulting reflected light is combined with reference light and detected. Parallel techniques can be accomplished in TD-OCT, SD-OCT or SS-OCT configurations. Spreading the light on the retina over a larger area will enable higher illumination powers. A semi- or non-confocal parallel detection of a larger portion of the light exiting the pupil will significantly increase the detection efficiency without losing out of focus light. This gain in sensitivity can be traded off for higher acquisition speed. The fast acquisition speed will result in comprehensively sampled volumes which are required for applying computational imaging techniques. Several groups have reported on different parallel FD-OCT configurations (see for example, Hiratsuka, H. et al., Opt. Lett. 23, 1420, 1998; Zuluaga, A. F. et al., Opt. Lett. 24, 519-521, 1999; Grajciar, B. et al., Opt. Express 13, 1131, 2005; Blazkiewicz, P. et al., Appl. Opt. 44, 7722, 2005; Považay, B. et al., Opt. Express 14, 7661, 2006; Nakamura, Y. et al., Opt. Express 15, 7103, 2007; Lee, S.-W. et al., IEEE J. Sel. Topics Quantum Electron. 14, 50-55, 2008; Mujat, M. et al., Optical Coherence Tomography and Coherence Domain Optical Methods in Biomedicine XIII 7168, 71681E, 2009; Bonin, T. et al., Opt. Lett. 35, 3432-4, 2010; Wieser, W. et al., Opt. Express 18, 14685-704, 2010; Potsaid, B. et al., Opt. Express 18, 20029-48, 2010; Klein, T. et al., Biomed. Opt. Express 4, 619-34, 2013; Nankivil, D. et al., Opt. Lett. 39, 3740-3, 2014) and recently a new parallel interferometric Fourier domain imaging technique called partial field holoscopy has been introduced (see for example, PCT Publication No. WO 2015/189174, the contents of which are hereby incorporated by reference).

The related fields of holoscopy, digital interference holography, holographic OCT, and Interferometric Synthetic Aperture Microscopy are also interferometric imaging techniques based on diffraction tomography (see for example, Kim, M. K., Opt. Lett. 24, 1693-1695, 1999; Kim, M.-K., Opt. Express 7, 305, 2000; Yu, L. et al., Opt. Commun. 260, 462-468, 2006; Marks, D. L. et al., J. Opt. Soc. Am. A 24, 1034, 2007; Hillmann, D. et al., Opt. Lett. 36, 2390-2, 2011, and PCT Publication No. WO 2015/189174). All of these techniques fall in the category of computational imaging techniques, meaning that post-processing is typically necessary to make the acquired data comprehendible for humans. They are commonly implemented in full-field configurations, although interferometric synthetic aperture microscopy is often also used in a point-scanning configuration.

As in FD-OCT, partial field systems benefit from the heterodyne amplification by the reference light. Because the reference light is typically much stronger than the sample light, it is also the main contributor of relative intensity noise (RIN). Balanced detection systems have been shown to suppress common mode noise and at the same time improve the dynamic range of the analog to digital conversion due to the subtraction of the DC term. In PCT Publication No. WO 2016/058910, the usefulness of balanced detection systems for partial field holoscopy systems was already discussed. Because of the spatially resolved detectors typically used in such systems it is desirable to use free space optics—rather than fiber optics—balanced detection system. Free space optics implementations of balanced detection systems can however be challenging due to their very strict alignment requirements.

SUMMARY

The current application describes several balanced detection system embodiments which reduce or overcome some of the alignment requirements of free space optics based balanced detection configurations. One embodiment of the present application is a partial field frequency-domain interferometric imaging system in which a light source generates a light beam that is divided into sample and reference arms and sample optics deliver the light beam in the sample arm to the object to be imaged. Return optics direct the light towards a balanced detection system. The balanced detection system comprises a balanced detection beam divider for combining light scattered from the sample with reference light which then generates two interference beat signals, one for each detection channel, as well as at least one detector. In one embodiment, the balanced detection system has two detectors and the balanced detection beam divider and detectors are aligned relative to each other. In another embodiment, in addition to being referenced to each other, the detectors are bonded directly to the balanced detection beam divider. In another embodiment, the balanced detection system has two detectors, but the detectors share a common substrate. The detectors in the balanced detector systems for these embodiments could comprise one or more photosensitive elements. In another embodiment, the balanced detection system comprises a single detector having a plurality of photosensitive elements combined with a lenslet array where the two detection channels are detected on the single detector in an interleaved fashion. In some embodiments, the light beam could illuminate a plurality of locations on the light scattering object with a spot, a line, or a two-dimensional area of illumination. The light beam could be scanned in one or two dimensions across the sample.

The embodiments described herein are not all-inclusive and many additional embodiments will be apparent to one of ordinary skill in the art in view of the figures and description. Moreover, it should be noted that the language used in the specification has been principally selected for readability and instructional purposes and not to limit the scope of the inventive subject matter.

DETAILED DESCRIPTION

Figure 1:
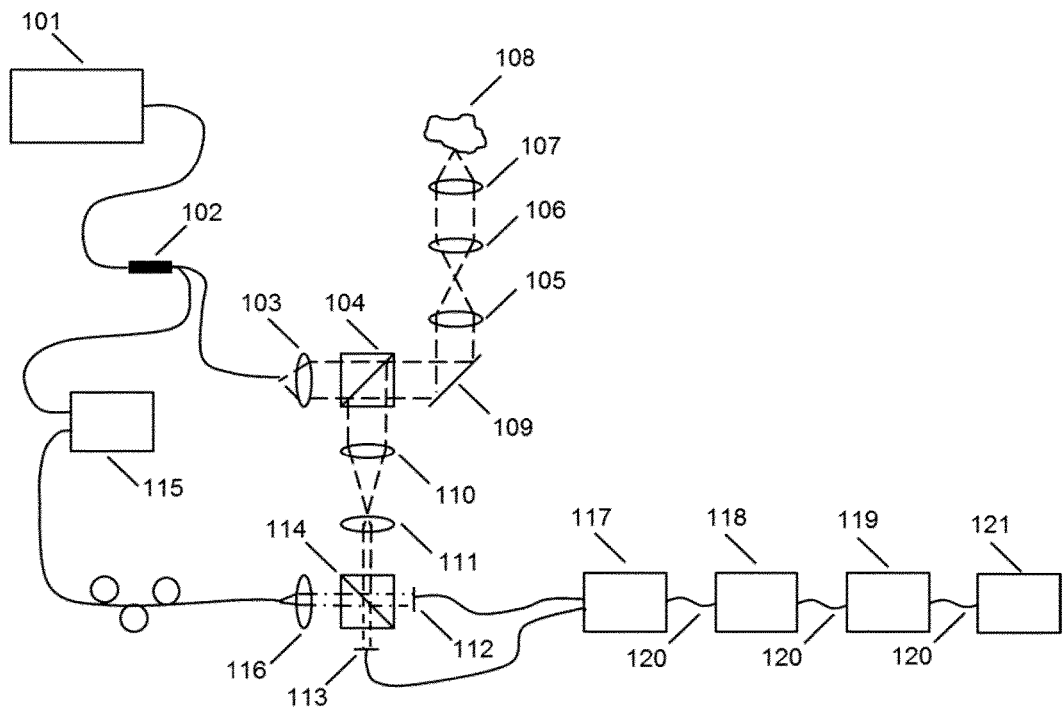
FIG. 1 illustrates a prior art swept source based partial field system using balanced detection.

All patent and non-patent references cited within this specification are herein incorporated by reference in their entirety to the same extent as if the disclosure of each individual patent and non-patient reference was specifically and individually indicated to be incorporated by reference in its entirely.

Various aspects of interferometric and holoscopic systems have been described in some of our co-pending applications (see for example US Patent Publication No. 2014/0028974, US Patent Publication No. 2015/0092195, PCT Publication No. WO 2015/052071, PCT Publication No. WO 2015/024663, and US Patent Publication No. 2015/0233700, the contents of all of which are hereby incorporated by reference).

The following definitions may be useful in understanding the detailed description:

Interferometric system: A system in which electromagnetic waves are superimposed, in order to extract information about the waves. Typically a single beam of at least partially coherent light is split and directed into different paths. These paths are commonly called sample path and reference path, containing sample light and reference light. The difference in optical path length creates a phase difference between them, which results in constructive or destructive interference. The interference pattern can be further analyzed and processed to extract additional information. There are special cases of interferometric systems, e.g. common path interferometers, in which the sample light and reference light travel along a shared path.

OCT System: An interferometric imaging system that determines the scattering profile of a sample along the OCT beam by detecting the interference of light reflected from a sample and a reference beam creating a three-dimensional (3D) representation of the sample. Each scattering profile in the depth direction (z) is reconstructed individually into an axial scan, or A-scan. Cross-sectional images (B-scans), and by extension 3D volumes, are built up from many A-scans, with the OCT beam moved to a set of transverse (x and y) locations on the sample. The axial resolution of an OCT system is inversely proportional to the spectral bandwidth of the employed light source. The lateral resolution is defined by the numerical aperture of the illumination and detection optics and decreases when moving away from the focal plane. OCT systems exist in time domain and frequency domain implementations, with the time domain implementation based on low coherence interferometry (LCI) and the frequency domain implementation based on diffraction tomography. OCT systems can be point-scanning, multi-beam or field systems.

Holoscopy: An interferometric frequency-domain computational imaging technique that detects backscattered light from multiple angles, in order to reconstruct a 3D representation of a sample with spatially invariant resolution. If the angular information from a single point, line, or two-dimensional area acquisition is insufficient for successfully reconstructing said 3D representation of a sample, two or more adjacent acquisitions can be combined to reconstruct said 3D representation of a sample. Holoscopy systems can be point-scanning, multi-beam or field systems.

Spatially invariant resolution: A lateral resolution that is first order independent of the axial position of the optical focal plane. Optical aberrations and errors in the reconstruction may lead to a slight loss of resolution with depth. This stands in contrast to Gaussian optics where the lateral resolution decreases when moving away from the focal plane.

Computational adaptive optics: The computational correction of aberrations with a higher order than defocus.

Point-scanning system: A confocal scanning system that transversely scans the sample with a small spot and detects the backscattered light from the spot at a single point. The single point of detection may be spectrally dispersed or split into two channels for balanced detection. Many points have to be acquired in order to capture a 2D image or 3D volume. Cirrus™ HD-OCT (Carl Zeiss Meditec, Inc., Dublin, Calif.) as well as all other commercial ophthalmic OCT devices, are currently point-scanning systems.

Multi-beam system: A system that transversely scans the sample with multiple confocal points in parallel. A multi-beam system typically employs a dedicated interferometer for each parallel acquisition channel. The backscattered sample light of each parallel acquisition channel is typically coupled into a dedicated single mode fiber for each parallel acquisition channel.

Field illumination system: An interferometric imaging system wherein the sample is illuminated with a contiguous field of light which is then detected with a spatially-resolved detector. This is in contrast to imaging systems which use a focused spot or multiple spatially-separated focused spots with a single detector for each spot. Examples of field illumination systems include line-field, partial-field and full-field systems.

Line-field system: A field illumination system that illuminates the sample with a line and detects backscattered light with a spatially resolved detector. Such systems typically allow capturing a B-scan without transverse scanning In order to acquire an enface image or volume of the sample, the line has to be scanned across the sample in one transverse direction.

Partial-field system: A field illumination system that illuminates an area of the sample which is smaller than the desired field of view and detects the backscattered light with a spatially resolved detector. In order to acquire an enface image or volume of the entire desired field of view one requires transverse scanning in two dimensions. A partial field illumination could be for example, a spot created by a low NA beam, a line, or any two-dimensional area including but not limited to a broad-line, an elliptical, square or rectangular illumination.

Full-field system: A field illumination system that illuminates the entire field of view (FOV) of the sample at once and detects the backscattered light with a spatially resolved detector. In order to acquire an enface image or volume, no transverse scanning is required.

Photosensitive element: An element that converts electromagnetic radiation (i.e., photons) into an electrical signal. It could be a photodiode, phototransistor, photoresistor, avalanche photodiode, nano-injection detector, or any other element that can translate electromagnetic radiation into an electrical signal. The photosensitive element could contain, on the same substrate or in close proximity, additional circuitry, including but not limited to transistors, resistors, capacitors, amplifiers, analog to digital converters, etc. When a photosensitive element is part of a detector it is also commonly referred to as pixel, sensel or photosite. A detector or camera can have an array of photosensitive elements.

Detector: We distinguish between 0D, 1D, and 2D detectors. A 0D detector would typically use a single photosensitive element to transform photon energy into an electrical signal. Spatially resolved detectors, in contrast to 0D detectors, are capable of inherently generating two or more spatial sampling points. 1D and 2D detectors are spatially resolved detectors. A 1D detector would typically use a linear array of photosensitive elements to transform photon energy into electrical signals. A 2D detector would typically use a 2D array of photosensitive elements to transform photon energy into electrical signals. The photosensitive elements in the 2D detector may be arranged in a rectangular grid, square grid, hexagonal grid, circular grid, or any other arbitrary spatially resolved arrangement. In these arrangements, the photosensitive elements may be evenly spaced or may have arbitrary distances in between individual photosensitive elements. The 2D detector could also be a set of 0D or 1D detectors optically coupled to a 2D set of detection locations. Likewise a 1D detector could also be a set of 0D detectors or a 1D detector optically coupled to a 2D grid of detection locations. These detection locations could be arranged similarly to the 2D detector arrangements described above. A detector can consist of several photosensitive elements on a common substrate or consist of several separate photosensitive elements. Detectors may further contain amplifiers, filters, analog to digital converters (ADCs), processing units or other analog or digital electronic elements on the same substrate as the photosensitive elements, as part of a read out integrated circuit (ROIC), or on a separate board (e.g. a printed circuit board (PCB)) in proximity to the photosensitive elements. A detector which includes such electronics in proximity to the photosensitive elements is in some instances called "camera."

Substrate: A thin slice of semiconductor material, e.g. silicon, silicon dioxide, gallium arsenide or indium phosphide, which serves as the foundation upon which electronic devices such as transistors, diodes, photodiodes, semiconductor light sources or integrated circuits are deposited. A substrate is sometimes also called a wafer.

Balanced detection: A method to reject common mode signals. Typically two slightly different copies of a signal are subtracted, where the resulting difference signal preserves some information and removes other information (considered noise). In optical interferometry, one typically uses a Mach-Zehnder type interferometer. The beamsplitter where the interference occurs typically has a reflection/transmission ratio of 50/50. The resulting two interference beat signals are captured by photodiodes and their photocurrents are subtracted from each other and converted to a voltage by e.g. a transimpedance amplifier. Because beamsplitters introduce a phase shift of $\pi$ to the reflected light, but no phase shift to the transmitted light, the resulting two interference beat signals exhibit a relative phase shift of $\pi$. Because the two signals are then subtracted, this phase shift results in an effective summation of the two interference beat signals. The common mode signals, like the DC term introduced by the reference light and auto-correlation terms (self-interference beat signals from only the sample arm or only the reference arm) are not affected by the phase shift however and are thus cancelled. This is because the phase shift does not affect the intensity of the light and thus the DC term is identical in the two subtracted channels. The auto-correlation signals are also cancelled because the self-interference occurs before the beamsplitter and hence a phase shift of the light does not affect the phase of the two auto-correlation interference beat signals.

Light beam: Should be interpreted as any carefully directed light path.

The optical power of light sources is, in reality, never completely stable, but exhibits some optical power fluctuations, which we call intensity noise. When this intensity noise is normalized to the average power level, it is called relative intensity noise (RIN). In SS-OCT and swept source based holoscopy, the intensity noise represents a significant noise source, which is why one typically takes additional measures, such as dual balancing, to suppress it. Frequency-domain imaging systems, especially systems for imaging biological tissue, which can only tolerate limited sample power, are ideally designed to have a high optical power from the reference arm shining on the detector, while the light from the sample only accounts for a very small portion of the light incident on the detector. This minimizes the auto-correlation terms created by self-interference of the sample light. Because the reference intensity is much higher than the intensity of the light returning from the sample, one can assume that the reference light is basically the sole contributor to the overall intensity noise.

In point-scanning SS-OCT systems, a balanced detection system can easily be implemented by connecting the output fibers of the 50/50 fused coupler, where the interference occurs, directly to two individual photodiodes. This has the advantage that one mainly has to take care to equalize the intensities in both fibers, but it is insensitive to the spatial alignment as long as the light exiting the fibers is captured by the respective photodiodes. In systems where very high frequency interference beat signals are being measured, the relative difference in length of the two balance channels may also become important, as it can introduce a relative delay between the two, which may reduce the common mode rejection ratio. Matching of the optical path lengths can be done either optically, for example by adjusting the lengths of the fibers, or electronically, for example by introducing a delay in the detection electronics. Matching of the intensities can be done either optically, for example by adjusting the intensity levels by optical attenuators or when the balancing subtraction is done after the digitization, digitally in post-processing, by normalizing the intensity of the recorded light in each balance channel numerically prior to the subtraction.

In parallel systems with spatially resolved detectors, such as partial field or full field systems, the alignment requirements are much more stringent. Because here one has to align the light to the two spatially resolved detectors in a fashion that not only equalizes the intensity in each corresponding pixel pair, but also ensures that each corresponding pixel pair collects light from a common spatial location.

A prior art swept source based partial field system using balanced detection (see for example, PCT Publication No. WO 2016/05891) is illustrated in FIG. 1. Light from a tunable light source 101 is split into sample light and reference light by a beam divider, in this case, fused coupler 102. A series of sample optics are used to deliver the light beam in the sample arm to the sample 108 (a light scattering object). First, the sample light is collimated by a spherical lens 103 and passes a beam splitter 104 on its path towards the sample 108. A set of spherical lenses, 105, 106, and 107, creates a region of illumination on the sample 108. The region could be a spot, a line or a two-dimensional area. The sample could be any light scattering object, but a common sample is the human eye. When the human retina is the sample, lens 107 is typically omitted. Its function is covered by the optics of the eye. The location of the area illumination on the sample can be adjusted transversely by scanning element 109. The scanning element could be a one-dimensional scanner, a two-dimensional scanner, or a pair of one-dimensional scanners. In the detection path (path from sample 108 to the detectors 112 and 113), light scattered by the sample is detected in a conjugate plane of the pupil of lens 107. A group of return optics is responsible for combining the light scattered from the sample and light from the reference arm and directing the combined light to the spatially resolved detectors 112 and 113. Lenses 106, 105, 110 and 111 relay the light from the pupil to the spatially resolved detectors 112 and 113. On this path, the light passes the beamsplitter 104 a second time and another beamsplitter 114 before it reaches the two detectors (112 and 113). By the time the reference light reaches beamsplitter 114, it has passed through a variable delay line 115 which allows the adjustment of the optical path length difference between the sample and reference light, before it is collimated by a spherical lens 116. Typically the variable delay line 115 is adjusted so that sample and reference light travel close to the same optical distance before they are recombined at beamsplitter 114, where they coherently interfere. Beamsplitter 114 not only recombines reference and sample light, but at its output, it creates two copies of the recombined light. We call them balance channel 1 and balance channel 2. The signals of the two channels are however not completely identical, because beamsplitter 114 introduces a relative pi phase shift between the cross-correlation signals of balance channel 1 and balance channel 2. The light in balance channel 1 reaches detector 112 and the light in balance channel 2 reaches detector 113. The interfering light is collected at each scanned location on the object by the detector which generates signals in response thereto. These signals are then, typically by analog electronics 117, e.g. a trans-impedance amplifier (TIA), subtracted from each other. Due to the relative pi phase shift between the cross-correlation signals of the two copies, the subtraction results effectively in a suppression of the DC term and auto correlation term as well as other common mode signals such as relative intensity noise, but a summation of the cross-correlation terms. Instead of implementing the subtraction in analog electronics, it is also possible to digitize the two signals and subtract them from each other on a processor in the digital domain.

The electrical signals from analog electronics 117 are transferred, via a cable 120, to a digitizer 118 before they are passed to the processor 119 via a cable 120. The processor 119 may, for example, contain a field-programmable gate array (FPGA), a digital signal processor (DSP), an application specific integrated circuit (ASIC), a graphic processing unit (GPU), a system on chip (SoC) or a combination thereof, which performs some, or the entire Fourier domain imaging signal processing steps, prior to passing the data on to the host processor, or may be the host processor. The processor 119 generates image data of the object from the detected signals. This could be a direct 3D representation of the light scattering object in the case of OCT or it could involve holoscopic reconstruction steps outlined in PCT Publication No. WO 2015/189174. The processor 119 can be operably attached to a display 121 for displaying images of the data. The sample and reference arms in the interferometer could consist of bulk-optics, photonic integrated circuits, fiber-optics or hybrid bulk-optic systems and could have different architectures such as Michelson, Mach-Zehnder or common-path based designs as would be known by those skilled in the art. While a transmissive delay line is shown in FIG. 1, those skilled in the art would appreciate that a reflective delay line could also be used. Each cable 120 could be replaced with a wireless data transmission or with a direct physical connection.

Figure 2:
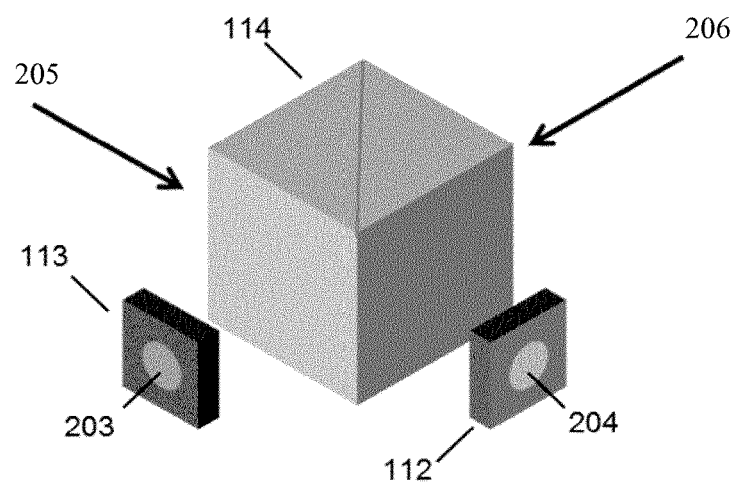
FIG. 2 shows the balanced detection configuration of the system illustrated in FIG. 1.

FIG. 2 shows the balanced detection configuration of the system illustrated in FIG. 1. Detectors 113 and 112, with active areas 203 and 204, are spatially separated from the beamsplitter 114. The active areas 203 and 204 of detectors 113 and 112 may contain one or more photosensitive elements. The active areas only span over a portion of the entire detectors. Sample light 206 and reference light 205 enter the beamsplitter 114 from the sides. In such a configuration, the detectors have to be carefully aligned in all spatial dimensions. Another drawback is that the detectors are spatially separated from each other, i.e. corresponding photosensitive elements of a photosensitive element pair are fairly far from each other. This has the disadvantage that diode leads have to be relatively long, which renders the system prone to radio frequency (RF) interference. Here we present several balanced detection configurations, which overcome these limitations.

Figure 3:
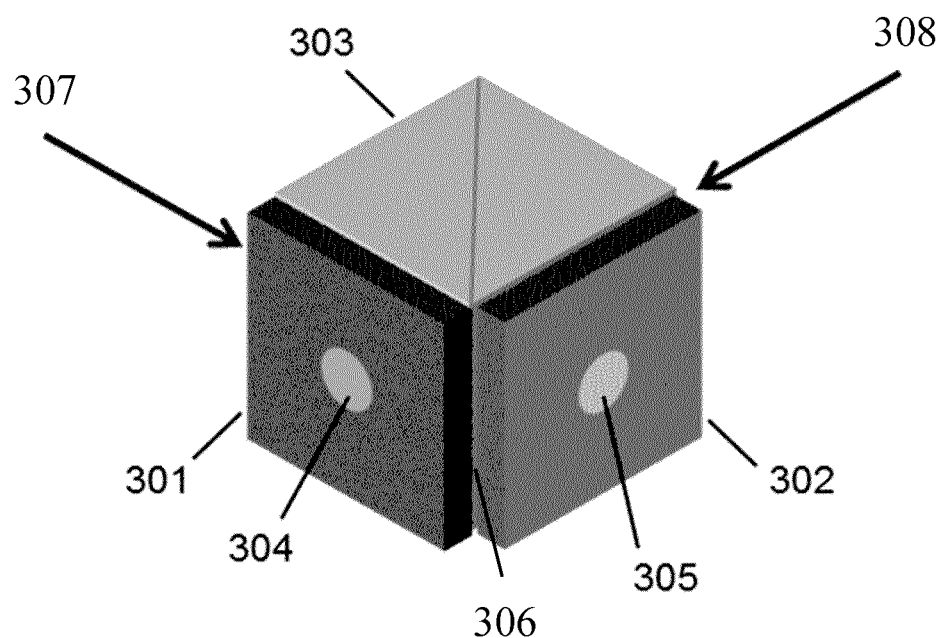
FIG. 3 illustrates an example balanced detection configuration for a precise alignment of a beamsplitter with respect to a detector's active area. In this configuration, the size of the detectors matches the size of the side of the beamsplitter.

In one embodiment of an improved balanced detection configuration illustrated in FIG. 3, the detectors 301 and 302 are sized to match the size of a side of beamsplitter 303 and are bonded directly to the respective sides of the beamsplitter 303. The active areas 304 and 305, which contain one or more photosensitive elements, may be as large as the entire detector or only cover a subsection of the entire detector. Similar to FIG. 2, sample light 308 and reference light 307 enter the beamsplitter 303 from the sides. Such a configuration enables more precise alignment because the beamsplitter 303, which is typically a precisely manufactured glass element, provides one or more reference surfaces for alignment. Bonding the detectors directly to the beamsplitter 303 also guarantees long term stability. Alternatively, one detector may be slightly larger, so it extends over the common edge 306 of the beamsplitter and butts up against the other detector. This may provide another alignment aid for mounting the second of the two detectors.

Figure 4:
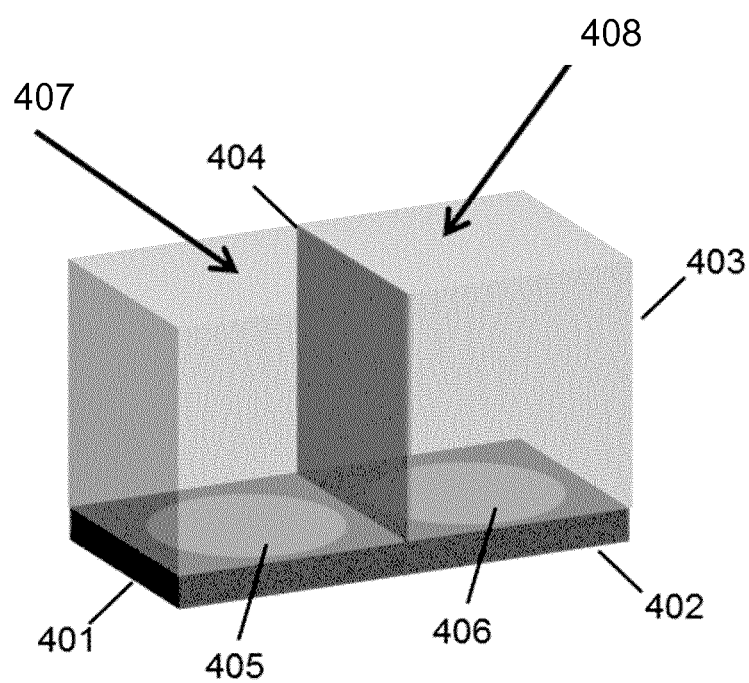
FIG. 4 illustrates another example balanced detection configuration according to the present invention. In this configuration, two detectors share a common substrate.

FIG. 4 illustrates a balanced detection configuration in which the detectors 401 and 402 share a common substrate. The beamsplitter 403 is in this case bonded on top of the two detectors. Beamsplitter 403 differs from common beamsplitter cubes in that it consists of two cuboids with a semi-reflective coating 404 in between, instead of two prisms with a semi-reflective coating in between. The semireflective coating 404 has to be positioned half way between the two active areas 405 and 406 of detectors 401 and 402. Each active area may contain one or more photosensitive elements. Sample light 408 and reference light 407 enter the beamsplitter 403 in this configuration from the top. In this configuration, light 407 entering the top of the beamsplitter 403 is partially transmitted by coating 404 and is measured by detector 402 and partially reflected by coating 404 and measured by detector 401. Similarly, light 408 is partially transmitted and reflected by coating 404 and measured by detectors 401 and 402. After reference light and sample light are recombined they coherently interfere. The two interference fringe signals exhibit a relative phase shift of $\pi$. This configuration has the advantage that the relative alignment between the two active areas is inherently done as part of the semiconductor manufacturing processes, which are typically extremely precise. One then just has to take care to position the semi-reflective layer 404 half way between the two active areas. Ideally the size of the surface to which the detectors are bonded matches the size of the detectors, so that the beamsplitter may serve again as an alignment aid.

Because both detectors in this configuration are already on a shared substrate, it may be desirable to integrate some or all of the analog electronics on this substrate as well. For example, a single mass-produced camera with integrated read out and signal processing electronics could be used. One half of the photosensitive elements would be used as 401 and the other half as 402. As mass-produced cameras typically include read out integrated circuits, which perform the digitization on board, it may be beneficial to perform the balancing subtraction digitally on the processor, after the signals from the photosensitive elements have been digitized on chip. Aside from cost benefits by using standard parts, one gains the advantage that intensities of photosensitive element pairs can be equalized numerically prior to the subtraction. Another advantage of digitizing the signal from each photosensitive element with an integrated analog to digital converter very close to the photosensitive element prior to the balancing subtraction, is that it avoids long leads, which may be susceptible to RF interference.

Figure 6:
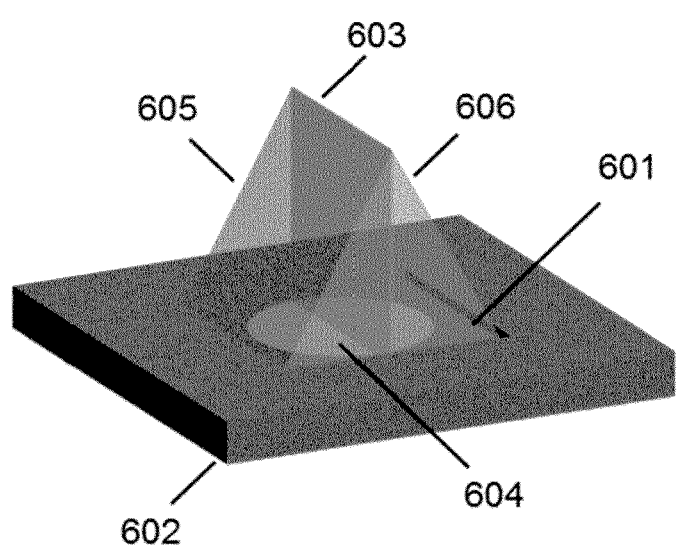
FIG. 6 illustrates another exemplary balanced detection configuration according to the present invention.
Figure 7:
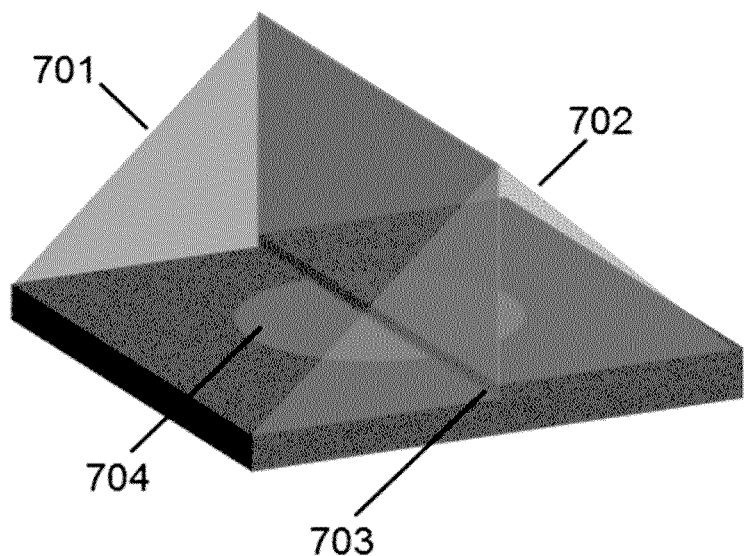
FIG. 7 illustrates another examplary balanced detection configuration according to the present invention.
Figure 8:
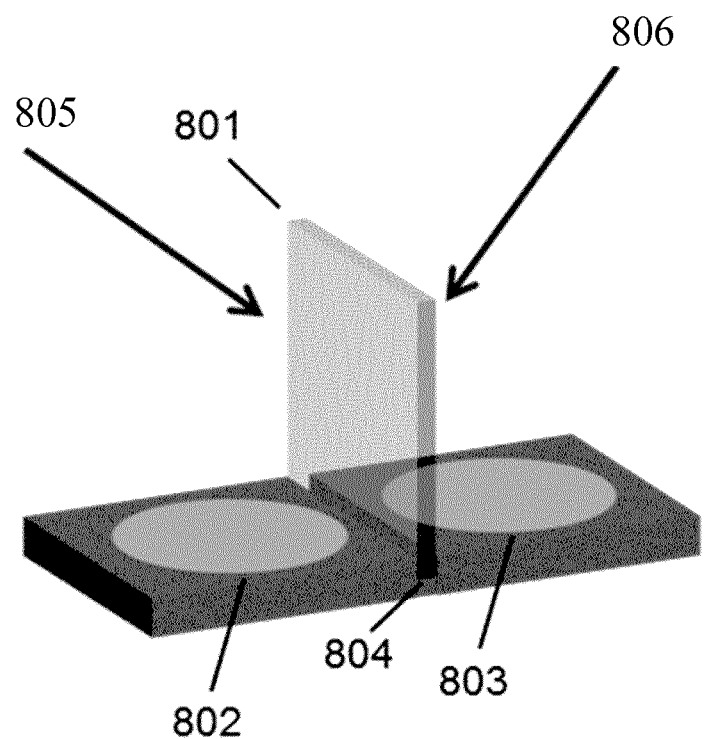
FIG. 8 shows an alternative balanced detection configuration of FIG. 4 with a plate beamsplitter instead of a cube beamsplitter.

Alternative embodiments of the same concept are illustrated in FIGS. 6-8. In FIG. 6, a mounting and alignment pit 601 is etched into the detector 602. This allows for pressing the beamsplitter 603 against one or more of the walls of the mounting and alignment pit 601 before fixating the beamsplitter and therefore enable a precise alignment with respect to the detector's active area 604. In contrast to the cube beamsplitter 403 in FIG. 4, the beamsplitter 603 is a triangular prism to illustrate that the beamsplitter may have various shapes. In some embodiments, it may be desirable to choose a shape which creates entrance surfaces 605 and 606 perpendicular to the light beams. In other embodiments, it may be desirable to design the beamsplitter in a way which creates a non-perpendicular angle between the entrance surface and light beam. For example, for compensating optical path length differences across the detectors.

A common beamsplitter design is to bond two pieces of polished glass together. One of the surfaces which is bonded together is typically coated with a semireflective coating. FIGS. 1-7 all show such beamsplitter designs. In the configuration shown in FIG. 7, it may be desirable to first place one half of the beamsplitter 701 onto the detector, before it is bonded to the second half 702. One half of the beamsplitter 701 is again pressed against an edged alignment wall 703, whereas the second half 702 is butted up against the first half 701 of the beamsplitter. This again allows for a very precise alignment of the beamsplitter with respect to the detector's active area 704.

The configurations schematically illustrated in FIGS. 4-7 are also realizable with alternative beamsplitter designs, such as plate beamsplitters. A plate beamsplitter is a thin glass window with a semireflective coating on one window surface. FIG. 8 shows the configuration first schematically illustrated in FIG. 4 with a plate beamsplitter 801 instead of a cube beamsplitter. To position the plate beamsplitter 801 precisely between the two active areas 802 and 803, a groove 804 is etched into the detector. The plate beamsplitter 801 is then fit into the groove and fixed in place (e.g. with an adhesive). It could also be clamped, fitted, or screwed. Similar to the configurations in FIGS. 2 and 3, sample light 806 and reference light 805 enter the beamsplitter 801 from the sides.

Figure 5:
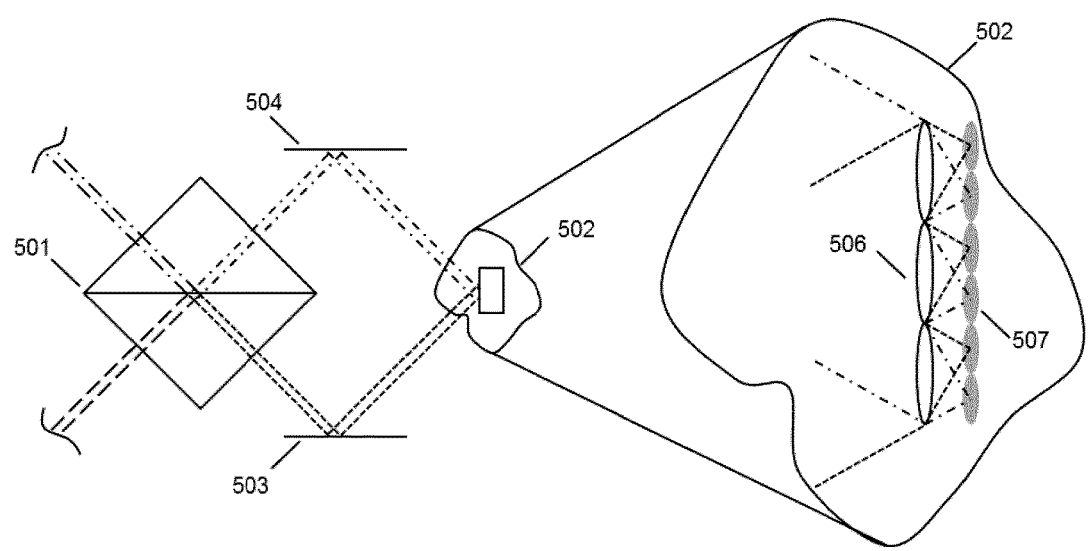
FIG. 5 illustrates an alternative balanced detection configuration in which a beamsplitter is spatially separated from a detector.

FIG. 5 illustrates an alternative balanced detection configuration in which the beamsplitter 501 is spatially separated from the detector 502. In this case, there is only one detector 502, however it has twice as many photosensitive elements 507, compared to a two detector configuration. In FIG. 5, a linear array of photosensitive elements is illustrated to keep the schematic simple. In many parallel interferometric imaging systems one may however choose to use a two dimensional array of photosensitive elements. Light from the sample (long dashed line) and light from the reference arm (long dash dotted line) coherently interferes at beamsplitter 501 and is split into balance channel 1 (short dashed line) and balance channel 2 (short dash dotted line). Mirrors 503 and 504 create a relative angle between the two channels and direct both light beams towards the detector 502.

Care has to be taken that the optical path length difference between the two channels on the way from the beamsplitter 501 to the detector 502 is kept small. Because especially at high interference fringe frequencies, a large path length difference will introduce an additional, undesirable phase shift between the two interference signals, which effectively results in a reduction of the common mode suppression ratio.

The right hand side of FIG. 5 shows an enlarged view of the detector 502. In the illustrated embodiment, the detector's active area 507 includes a plurality of photosensitive elements. A lenslet array 506 is positioned in front of the active area. If the active area includes only two photosensitive elements, only a single lens would be required. In the illustrated embodiment, the lenslet array 506 focuses light from balance channel 1 and balance channel 2 to every other photosensitive element in an interlaced fashion. For example, light from balance channel 1 is focused onto even numbered photosensitive elements and light from balance channel 2 is focused to odd numbered photosensitive elements. To achieve this, an angle has to be introduced between light from balance channel 1 and balance channel 2. Because the light hits each lenslet under an angle, its foci do not lie on each lenslet's axis. And because light from balance channel 1 and light from balance channel 2 hit the lenslet array under different angles, their foci do not coincide. In fact, the angles under which light from balance channel 1 and 2 hit the lenslet array can be chosen in a manner which focuses the light on adjacent photosensitive elements. This has the advantage that only one detector has to be aligned and that photosensitive element pairs reside next to each other. This minimizes the length of the leads from the photosensitive elements to the location where the signal from photosensitive element pairs is subtracted from each other and thus the susceptibility to RF interference. Some or all of the analog electronics may be implemented on the same substrate, which also houses the photosensitive elements. Alternatively, the analog electronics can be implemented as a read out integrated circuit, which is bonded to the detector substrate.

Instead of implementing the balancing in analog electronics one can use a common mass produced camera without balancing capabilities as a detector and perform the balancing subtraction digitally on the processor, after the signals from the photosensitive elements were digitized. Aside from cost benefits by using standard parts, one gains the advantage that intensities of photosensitive element pairs can be equalized numerically prior to the subtraction.

While the active detector areas are in this application schematically illustrated as disks, they may also have other shapes, such as squares or hexagons.

In the above description, for purposes of explanation, numerous specific details are set forth in order to provide a thorough understanding of the specification. It should be apparent, however, that the subject matter of the present application can be practiced without these specific details. It should be understood that the reference in the specification to "one embodiment", "some embodiments", or "an embodiment" means that a particular feature, structure, or characteristic described in connection with the embodiment is included in one or more embodiments of the description. The appearances of the phrase "in one embodiment" or "in some embodiments" in various places in the specification are not necessarily all referring to the same embodiment(s).

The foregoing description of the embodiments of the present subject matter has been presented for the purposes of illustration and description. It is not intended to be exhaustive or to limit the present embodiment of subject matter to the precise form disclosed. Many modifications and variations are possible in light of the above teaching. It is intended that the scope of the present embodiment of subject matter be limited not by this detailed description, but rather by the claims of this application. As will be understood by those familiar with the art, the present subject matter may be embodied in other specific forms without departing from the spirit or essential characteristics thereof.

The invention claimed is:

1. A frequency-domain interferometric imaging system for imaging a light scattering object comprising:
    a light source for generating a light beam;
    a beam divider for separating the light beam into reference and sample arms, wherein the sample arm contains the light scattering object to be imaged;
    sample optics for delivering the light beam in the sample arm to the light scattering object to be imaged;
    return optics for directing light from the sample arm and the reference arm to a balanced detection system, said balanced detection system having a balanced detection beam divider for combining light scattered from the object and light from the reference arm and directing the combined light into two detection channels, said balanced detection system further comprising a detector having an array of detector elements and a lenslet array aligned with the array of detector elements, and wherein the light in the two detection channels is directed at the lenslet array from two different directions in a manner so that the light from the two detection channels is interleaved on the array of detector elements; and
    a processor for processing the generated signals and for generating image data of the object based on the processed signals.

2. The frequency-domain interferometric imaging system as recited in claim 1, wherein the light beam is scanned over the light scattering object in one dimension.

3. The frequency-domain interferometric imaging system as recited in claim 1, wherein the light beam is scanned over the light scattering object in two dimensions.

4. The frequency-domain interferometric imaging system as recited in claim 1, wherein the detector has a linear array of photosensitive elements.

5. The frequency-domain interferometric imaging system as recited in claim 1, wherein the detector has a two dimensional array of photosensitive elements.

* * * * *

UNITED STATES PATENT AND TRADEMARK OFFICE
CERTIFICATE OF CORRECTION

PATENT NO.         : 10,436,573 B2
APPLICATION NO.    : 15/782018
DATED              : October 8, 2019
INVENTOR(S)        : Tilman Schmoll et al.

It is certified that error appears in the above-identified patent and that said Letters Patent is hereby corrected as shown below:

On the Title Page

On page 2, in item (56), in Column 2, under "Other Publications", Line 3, delete "Reflectomety"," and insert -- Reflectometry", --, therefor.

In the Specification

In Column 4, Line 1, delete "examplary" and insert -- exemplary --, therefor.

In Column 5, Line 37, delete "scanning" and insert -- scanning. --, therefor.

Signed and Sealed this
Third Day of March, 2020

Andrei Iancu
*Director of the United States Patent and Trademark Office*